United States Patent [19]
Eran et al.

[11] Patent Number: 5,912,439
[45] Date of Patent: Jun. 15, 1999

[54] SYSTEM AND METHOD FOR SAFETY CONTROL IN VEHICLES

[76] Inventors: Oded Eran, P.O. Box 52, 70500 Kiryat Akron; Ilan Gonen, P.O. Box 40050, 90805 Meyasaerel Zion, both of Israel

[21] Appl. No.: 08/901,833

[22] Filed: Jul. 28, 1997

[51] Int. Cl.$^6$ ............ G01G 19/08; B60Q 1/00; G06F 15/20
[52] U.S. Cl. .............. 177/136; 340/440; 701/39
[58] Field of Search ................ 177/136, 137, 177/138, 139, 141; 340/440; 701/39

[56] References Cited

U.S. PATENT DOCUMENTS

| | | | |
|---|---|---|---|
| 4,839,835 | 6/1989 | Hagenbuch | 177/141 |
| 4,852,674 | 8/1989 | Gudat | 177/141 |
| 4,854,407 | 8/1989 | Wagner | 177/141 |
| 4,952,908 | 8/1990 | Sanner | 340/440 |
| 5,032,821 | 7/1991 | Domanico et al. | 340/440 |
| 5,167,289 | 12/1992 | Stevenson | 177/141 |
| 5,327,347 | 7/1994 | Hagenbuch | 364/567 |
| 5,391,843 | 2/1995 | Sato et al. | 177/141 |
| 5,410,109 | 4/1995 | Tarter et al. | 177/136 |
| 5,520,045 | 5/1996 | Edri | 73/146 |

OTHER PUBLICATIONS

Lucas NovaSensor, 1055 Mission Ct., Fremont, CA 94539: Catalogue and Spec Sheet No Date.

*Primary Examiner*—Randy W. Gibson
*Attorney, Agent, or Firm*—Mark M. Friedman

[57] ABSTRACT

An on-board system for safety control in a vehicle, the vehicle including a plurality of axles and a plurality of load bearing units and wheels arranged on both sides of each of the axles and therefore on both sides of the vehicle, the system comprising (a) load sensors, each of the load sensors being associated with one of the plurality of load bearing units, each of the load sensors being for generating an input signal proportional to an actual load being imposed on its respective load bearing unit, thereby serving for measuring the actual load; and (b) a control unit, the control unit being in data communication with each of the sensors, such that the control unit collects the input signals, the control unit including (i) a first summing unit for summing the input signals and for generating a total load output signal being proportional to a sum of the actual loads imposed on all of the load bearing units; and (ii) a first comparator for comparing the total load output signal with a threshold total load value.

33 Claims, 5 Drawing Sheets

SYSTEM AND METHOD FOR SAFETY CONTROL IN VEHICLES

FIELD AND BACKGROUND OF THE INVENTION

The present invention relates to an on-board system and a method for safety control in vehicles and, more particularly, to an on-board integrated system and a method for safety control in heavy vehicles, such as trucks and other transporting vehicles.

A vehicle of any type is designed to carry up to a maximum load in a predesigned distribution over its load bearing system. Overloading a vehicle is associated with reduced safety while transporting the load, with accelerated aging of various parts and systems of the vehicle, including the bearing system, the break system, the axles, the wheels, the engine, etc., and with accelerated aging of the roads, all of which contribute to reduced safety.

Overloading affects the ability to accelerate and decelerate, the functionality of the shock absorbing (suspension) system (i.e., the bearings), the heating of the wheels, and may lead to dangerous side acceleration and therefore side lean, all of which may end-up in situations one would like to avoid.

Overloaded vehicles, introduce a safety hazard to other commuters, damage the roads and break the law. Since in most cases a driver is not involved in the loading process, the driver of an overloaded vehicle is not always aware of the overload condition in the beginning of the ride. At the time the driver becomes aware of the situation it may be too late, since the vehicle may have already lost its breaks on a down slope or lost its balance entering even a moderate curve.

There are several prior art systems which are designed for on-board measure of the load on the vehicle. These systems are typically used for commercial proposes, i.e., to measure the weight of goods which are priced by their weight.

U.S. Pat. No. 5,410,109 to Tarter et al. discloses a vehicle on-board weighting system and method, which include measuring the total weight over each load bearing unit and presenting the individual and total loads. However, this system fails to provide additional safety parameters, and/or to integrate the information collected into hazardous signal(s) and/or transportation limitations which are associated with any specific vehicle.

Additional prior art on-board weighting systems which perform even less include U.S. Pat. Nos. 5,270,494; 5,393,936; 5,478,974; and 5,230,392. None of the prior art systems monitor a "safety envelop", i.e., a collection of measured and calculated parameters which enable to determine whether a vehicle is in some kind of dangerous or unlawful condition.

There is thus a widely recognized need for, and it would be highly advantageous to have, an on-board integrated system and method for safety control in heavy vehicles, such as trucks and other transporting vehicles which provides the operator with safety information concerning the vehicle.

SUMMARY OF THE INVENTION

According to the present invention there is provided an on-board system for safety control in a vehicle.

According to further features in preferred embodiments of the invention described below, the vehicle including a plurality of axles and a plurality of load bearing units and wheels arranged on both sides of each of the axles and therefore on both sides of the vehicle, the system comprising (a) load sensors, each of the load sensors being associated with one of the plurality of load bearing units, each of the load sensors being for generating an input signal proportional to an actual load being imposed on its respective load bearing unit, thereby serving for measuring the actual load; and (b) a control unit, the control unit being in data communication with each of the sensors, such that the control unit collects the input signals, the control unit including (i) a first summing unit for summing the input signals and for generating a total load output signal being proportional to a sum of the actual loads imposed on all of the load bearing units; and (ii) a first comparator for comparing the total load output signal with a threshold total load value.

According to still further features in the described preferred embodiments the system further comprising (c) an indication unit communicating with the control unit; wherein whenever the total load output signal exceeds the threshold total load value the indication unit generates an indication indicating that the total load output signal exceeds the threshold total load value.

According to still further features in the described preferred embodiments the control unit is programmable, such that the threshold total load value is programmable.

According to still further features in the described preferred embodiments the control unit including (i) a summing unit for summing signals derived from sensors associated with one of the axles at a time, and for generating a single axle load output signal being proportional to a sum of the actual loads imposed on one of the axles; and (ii) a comparator for comparing the single axle load output signal with a threshold maximal axle load value. In this case the system preferably further comprising (c) an indication unit communicating with the control unit; wherein whenever the single axle load output signal exceeds the threshold maximal axle load value the indication unit generates an indication indicating that the single axle load output signal exceeds the threshold maximal axle load value.

According to still further features in the described preferred embodiments the control unit including (i) a unit for generating a single wheel load output signal being proportional to the actual load imposed on one of the wheels; and (ii) a comparator for comparing the single wheel load output signal with a threshold maximal wheel load value. In this case the system preferably further comprising (c) an indication unit communicating with the control unit; wherein whenever the single wheel load output signal exceeds the threshold maximal wheel load value the indication unit generates an indication indicating that the single wheel load output signal exceeds the threshold maximal wheel load value.

According to still further features in the described preferred embodiments the control unit including (i) a first summing unit for summing signals derived from sensors associated with one of the sides of the vehicle, and for generating a first single side load output signal being proportional to a sum of the actual loads imposed on that side of the vehicle; (ii) a second summing unit for summing signals derived from sensors associated with the other side of the vehicle, and for generating a second single side load output signal being proportional to a sum of the actual loads imposed on the other side of the vehicle; (iii) a difference generating unit for generating a vehicle side difference load output signal being proportional to a difference of the actual loads imposed on the sides of the vehicle; and (iv) a comparator for comparing the vehicle side difference load output signal with a threshold maximal vehicle side difference load value. In this case the system preferably further comprising (c) an indication unit communicating with the control unit; wherein whenever the vehicle side difference load output signal exceeds the threshold maximal vehicle side difference value the indication unit generates an indication indicating that the vehicle side difference load output signal exceeds the threshold maximal vehicle side difference value.

According to still further features in the described preferred embodiments the control unit including (i) a summing-averaging unit for summing and averaging signals derived from sensors associated with at least some of the wheels of the vehicle, and for generating an average wheel load output signal being proportional to an average imposed on each of the wheels of the at least some wheels; and (ii) a plurality of comparators for comparing the average wheel load output signal with the actual loads for each of the wheels of the at least some wheels. In this case the system preferably further comprising (c) an indication unit communicating with the control unit; wherein whenever one of the actual loads differs from the average wheel load output signal the indication unit generates an indication.

According to still further features in the described preferred embodiments the system further comprising a side accelerometer being mounted on the vehicle, the side accelerometer being for generating an acceleration input signal proportional to an actual side acceleration being imposed on the vehicle, thereby serving for measuring the side acceleration of the vehicle. In this case the control unit being in data communication with each of the sensors and with the side accelerator, such that the control unit collects the load and acceleration input signals, the control unit including (i) a first summing unit for summing signals derived from sensors associated with one of the sides of the vehicle, and for generating a first single side load output signal being proportional to a sum of the actual loads imposed on that side of the vehicle; (ii) a second summing unit for summing signals derived from sensors associated with the other side of the vehicle, and for generating a second single side load output signal being proportional to a sum of the actual loads imposed on the other side of the vehicle; (iii) a side-slope determinator for generating a side-slope output signal being proportional to an actual side-slope to which the vehicle being imposed by comparing the first and second single side load output signals; (iv) an acceleration-slope determinator for generating an acceleration-slope output signal; and (v) a comparator for comparing the acceleration-slope output signal with a threshold maximal acceleration-slope value. Preferably the system further comprising an indication unit communicating with the control unit; wherein whenever the acceleration-slope output signal exceeds the threshold maximal acceleration-slope value the indication unit generates an indication indicating that the acceleration-slope output signal exceeds the threshold maximal acceleration-slope value.

According to still further features in the described preferred embodiments provided is an on-board system for safety control in a vehicle comprising (a) an angle sensor mounted on the vehicle for generating a side-slope output signal being proportional to an actual side-slope to which the vehicle being imposed, thereby serving for measuring the actual side slope; (b) a side accelerometer being mounted on the vehicle, the side accelerometer being for generating an acceleration input signal proportional to an actual side acceleration being imposed on the vehicle, thereby serving for measuring the side acceleration of the vehicle; (c) a control unit, the control unit being in data communication with the angle sensor and with the side accelerator, such that the control unit collects the side-slope and the acceleration input signals, the control unit including (i) an acceleration-slope determinator for generating an acceleration-slope output signal; and (ii) a comparator for comparing the acceleration-slope output signal with a threshold maximal acceleration-slope value.

According to still further features in the described preferred embodiments provided is a method for safety control in a vehicle. The method comprising any combination of the following steps (a) indicating that a total imposed on the vehicle exceeding a maximal total load value; (b) indicating that a single axle load exceeding a threshold maximal axle load value; (c) indicating that a single wheel load exceeding a threshold maximal single wheel load value; (d) indicating that a side difference load exceeding a threshold maximal vehicle side difference load value; (e) indicating that an actual load being imposed on a wheel being different from a measured and calculated average wheel load; and (f) indicating that an acceleration-slope value exceeding a threshold maximal acceleration-slope value.

The present invention successfully addresses the shortcomings of the presently known configurations by providing a system and method for monitoring whether a vehicle is within its safety envelope.

It is an object of the present invention to provide a system for monitoring the safety parameters of a loaded vehicle.

It is another object of the present invention to provide simple and reliable system that can be easily mounted as an add-on to any vehicle without the need to make structural modifications to its frame.

It is still another object of the present invention to provide a system which is easily calibrated by self calibration means using only external forces to simulate load and riding strains.

It is yet another object of the present invention to provide a system which is versatile in that it suits all heavy vehicles with only slight modifications to the hardware (sensors), whereas the software is programmable.

Still another object of the invention to monitor and record the vehicle's performances and history.

These and other objects and advantages of the present invention are described hereinafter.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is of an on-board system and method for safety control in vehicles which can be used to monitor whether a vehicle performs within its "safety envelope", which is dedicated to any specific vehicle. Specifically, the present invention can be used to measure and calculate safety factors and compare them to introduced predetermined safety threshold values and to report of deviations of the measured factors from the thresholds, thereby to increase safety while driving heavy vehicles, such as trucks and other transporting vehicles.

The term "safety envelope" as used herein refers to a collection of measured and calculated parameters which enable to determine whether a vehicle is in some kind of dangerous or unlawful condition. The term "vehicle" as used herein refers to a load carrier suitable for transporting loads, either by its own mobility or by being towed by another carrier.

The principles and operation of the system according to the present invention may be better understood with reference to the drawings and accompanying descriptions.

Figure 1:
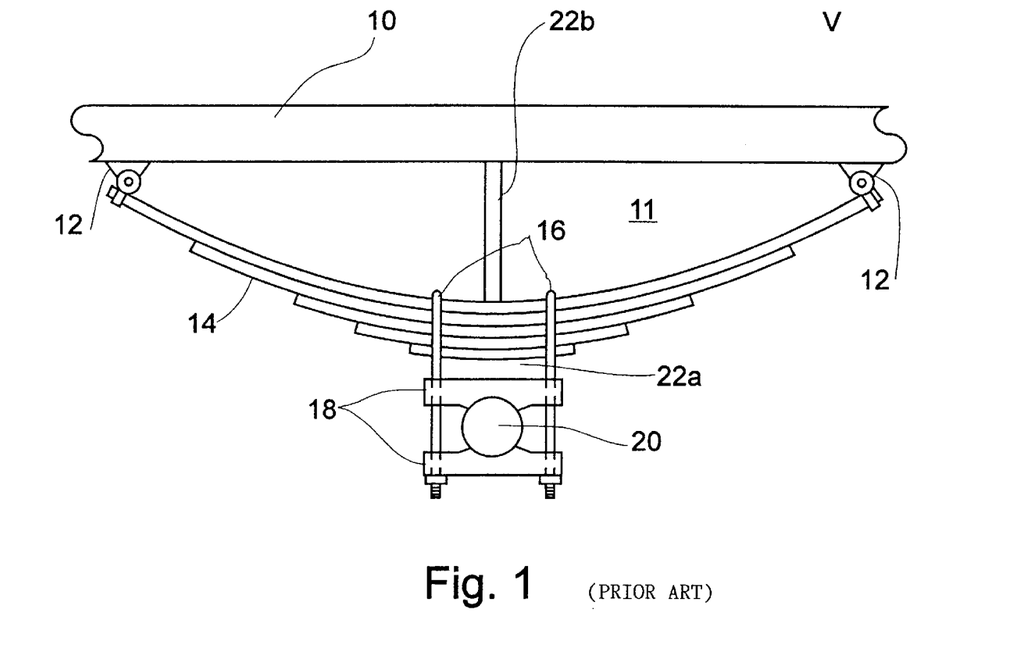
FIG. 1 is a schematic view of two alternative load sensors mounted in the load bearing unit of a leaf-spring suspension vehicle in accordance with the teachings of the present invention.
Figure 2:
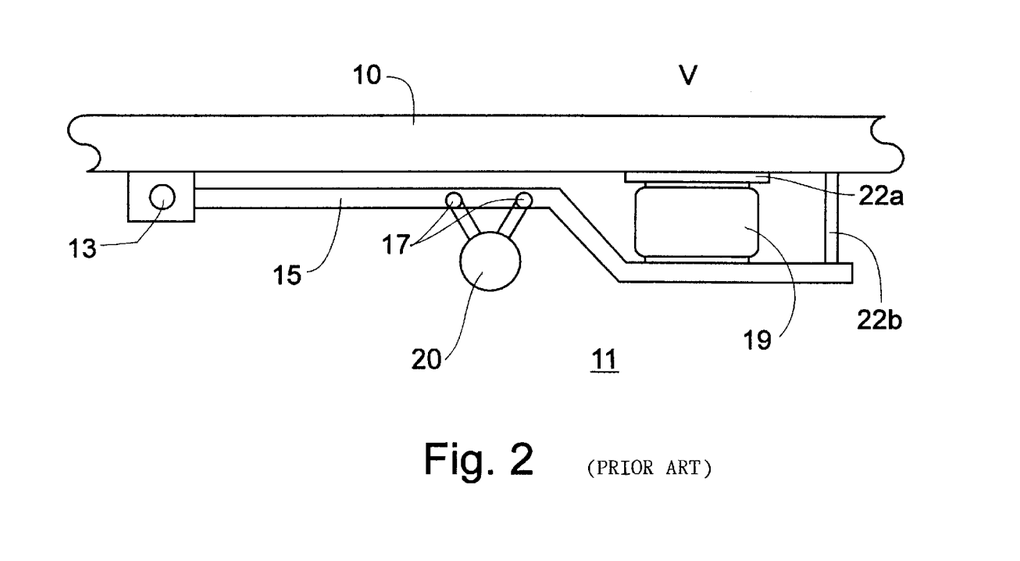
FIG. 2 is a schematic view of two alternative load sensors mounted in the load bearing unit of an air-ride suspension vehicle in accordance with the teachings of the present invention.

Referring now to the drawings, FIGS. 1–2 illustrate few examples of load sensors which form the measuring devices of the system according to the present invention. The term "load sensor" as used herein refers to a sensor capable of generating an output signal which is proportionate to either a weight or pressure it is imposed to.

Thus, depending on its type, load sensor 22 is mounted on the vehicle such that it is exposed to a load associated weight or pressure. FIGS. 1–2 present two alternatives for mounting load sensor 22 in context of two types of load bearing units 11 of a vehicle V, such as a truck.

The load bearing (suspension) unit shown in FIG. 1 includes a leaf-spring assembly 14 and an axle saddle 18, which is attached to axle 20. Axle 20 is understood to be part of vehicle V, which includes at least one additional axle. U-bolts 16 hold the assembly of axle 20, axle saddles 18 and leaf-spring assembly 14 securely together. Bracket hanger support assembly 12 fastens leaf-spring assembly 14 to frame 10 of vehicle V.

The load bearing unit of FIG. 2 includes an air-ride assembly 19 of a trailing-arm suspension. Pivot assembly 13 is fastened to frame 10 of vehicle V and supports trailing-arm 15. Trailing-arm 15 is attached to axle 20 by pivoting members 17. Air-ride assembly 19 is fastened to arm 15 and frame 10.

In both cases, load sensor 22 is either a weight sensor 22a and is suitably implemented, for example, between leaf-spring assembly 14 and axle saddle 18 (FIG. 1), or between air-ride assembly 19 and frame 10 (FIG. 2), alternatively, load sensor 22 is a pressure sensor 22b, and is suitably implemented, for example, between leaf-spring assembly 14 and frame 10 (FIG. 1), or alternatively, between trailing-arm 15 and frame 10.

Load sensor 22, be it a weight sensor or a pressure sensor, is for generating an input signal which is proportional to the actual load imposed on load bearing unit 11, thereby sensor 22 serves for measuring the actual load.

Load sensor 22 may be any prior art sensor which functions as described. It may sense the whole weight/pressure generated by the load, alternatively, it may sample a known fraction of that weight/pressure. In both cases an input signal proportional (e.g., identical) to the actual load imposed on the associated load bearing unit is generated.

The prior art cited in the Background section describes various load sensors which are suitable sensors for the system of the present invention. Therefore, U.S. Pat. Nos. 5,410,109; 5,270,494; 5,393,936; 5,478,974; and 5,230,392, are incorporated by reference as if fully set forth herein.

Other suitable load sensors are those based on measuring the angle (e.g., via an optical encoder) between two rods which are connected in an angular fashion to one another at one end, and to the vehicle's frame and the axle at their other ends, wherein the angle formed between the rods is a product of the load enforced by the vehicle on the bearing unit. Measuring the angle may be effected using suitable optical encoders, as well known in the art.

Yet, other suitable load sensors are those based on a spring connected to the frame at one end and to the axle on the other, the pressure imposed on the spring via the load is measured. Such sensors are distributed by Tedea-Huntleight Incorporated (7800 Deering Avenue, Canoga Park, Calif. 91304) as tension-compression load cells models 601–616.

Other suitable pressure sensors are the piezoresistive chips distributed for example by Lucas NovaSensor, 1055 Mission Court, Fremont, Calif. 94539; the FUJIKURA pressure sensors distributed by Servofio Corp., 75 Allen St., Lexington, Mass. 02173. Other suitable load cells both pressure and weight sensors are distribute by Transducer Techniques, 4317 Business Park Drive, B-101, Tumecula, Calif. 92590.

Further descriptions of the system according to the present invention relate to a vehicle which includes a plurality of axles, such as axles 20 of FIGS. 1–2, and a plurality of load bearing units, such as units 11 of FIGS. 1–2, and wheels. The load bearing units and the wheels are arranged on both sides of each of the axles and therefore on both sides of the vehicle, all as well known in the art. There may be a pair of wheels per axle, or in some cases two pairs, or more.

Figure 3:
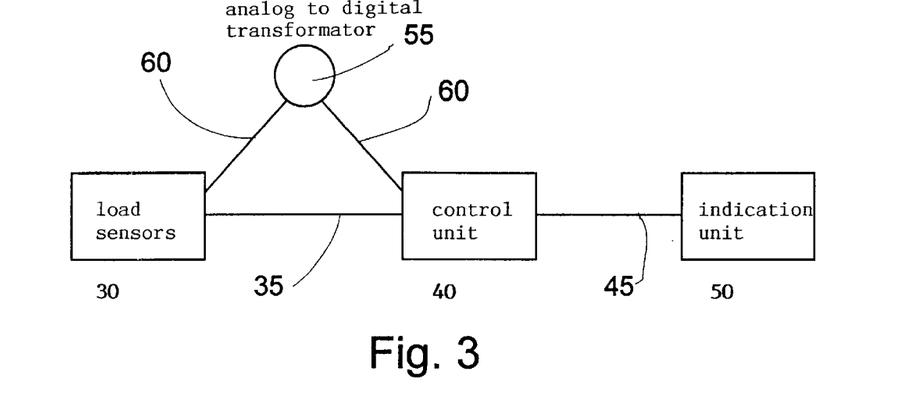
FIG. 3 is a schematic depiction of the components of the system according to the present invention.

FIG. 3 schematically presents the components of the system according to the present invention. The system includes a plurality of load sensors, indicated by box 30. Each of the load sensors is associated with one of the plurality of load bearing units and serves for generating an input signal which is proportional to an actual load imposed on its respective load bearing unit, thereby serves for measuring that actual load imposed on its respective bearing unit or wheel.

The system further includes a control unit, indicated by box 40. As indicated by line 35, the control unit is in data communication with each of the load sensors, such that the control unit collects the input signals generated by the sensors for further processing as described hereinafter with respect to specific embodiments of the invention.

In a preferred embodiments of the invention, the system further includes an indication unit, indicated in FIG. 3 by box 50. As indicated by line 45, the indication unit is communicating with the control unit and functions as further described hereinbelow with respect to the various embodiments of the invention.

As will become apparent to one ordinarily skilled in the art while reading the following descriptions of the specific embodiments of the invention, the system according to the present invention may operate employing analog signals or digital signals. Since the load sensors inherently generate analog signals (e.g., current, resistance, current amplitude, voltage, etc.), should digital signals be of choice, an analog to digital transformator 55 communicating, as indicated by 60, with the sensors and with the control unit is employed to convert the analog signals generated by the sensors to digital signals readable by the unit. Transformator 55 may be an integral part of each of the sensors or of the control unit, or, as depicted in FIG. 3, be a separate unit. Suitable analog to digital transformator are described in U.S. Pat. Nos. 3,83, 590; 4,213,806, 4,511,413 and Re 28,633, which are incorporated by reference as if fully set forth herein.

The data communication between any of the components of the system according to the present invention may be effected via wire or wireless communication media, as well known in the art. Wireless communication media may include radio, infrared and ultrasound communication media.

Figure 4:
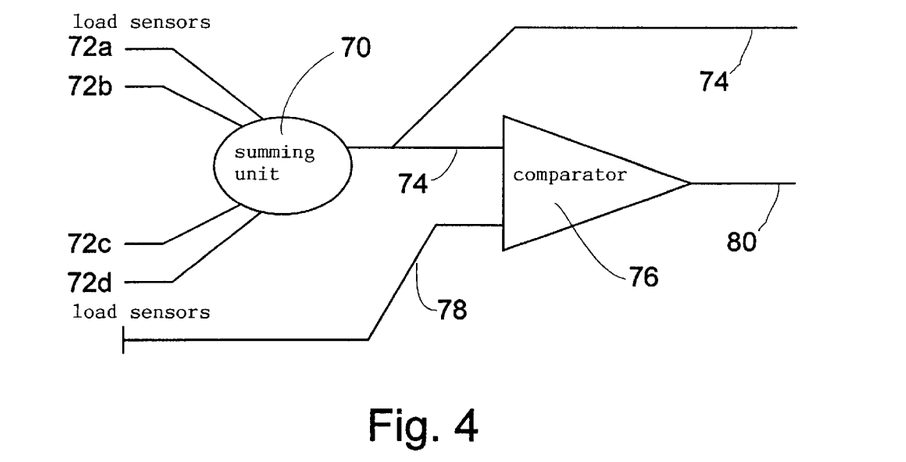
FIG. 4 depicts a basic algorithm which summarize the total load of the vehicle and compares that load to a threshold value according to the present invention.

With reference now to FIG. 4, presented is a first embodiment of the system according to the present invention. According to the first embodiment, the system is directed at determining the total load (weight) of the vehicle and comparing that weight to a threshold total load value.

To this end, the control unit includes a summing unit 70. Summing unit 70 sums the input signals generated by each of the load sensors, as indicated by 72*a–d,* and generates a total load output signal, as indicated by 74, which is proportional (e.g., identical) to the sum of the actual loads imposed on all of the load bearing units or wheels of the vehicle. Signal 74 may be used for monitoring the loads transported by the vehicle over a period of time and is therefore preferably recorded or stored in a non volatile memory device.

Control unit further includes a comparator 76 for comparing total load output signal 74 with a threshold total load value, indicated by 78. According to a preferred embodiment, whenever total load output signal 74 exceeds threshold total load value 78, the indication unit generates an indication, as indicated by 80, indicating that the total load output signal exceeds the threshold total load value.

The indication may be any sensible indication, such as visible and/or audible alarm. The indication may also be of informative value, e.g., a numerical description of the total load or overload presented on a display in suitable units (e.g., Kgs, percents, etc.).

In another preferred embodiment of the invention the control unit is programmable, such that the threshold total load value is programmable. Therefore, when the system is implemented, for example, as an add-on in an existing vehicle, the unit is programmed to include the threshold total load value attributed to the vehicle by its manufacturer or local regulations.

Figure 5:
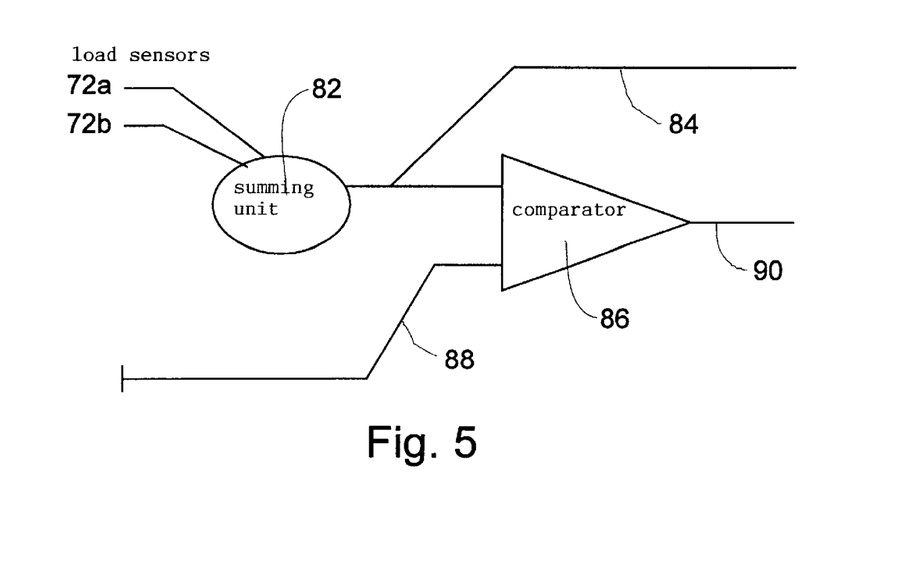
FIG. 5 depicts a basic algorithm which summarize the load imposed on a single axle of the vehicle and compares that load to a threshold value according to the present invention.

With reference now to FIG. 5, presented is a second embodiment of the system according to the present invention. According to the second embodiment, the system is directed at determining the load imposed on a single axle of the vehicle and comparing that load to a threshold value.

As for the first embodiment described above, to this end the control unit includes a summing unit, indicated by 82. Summing unit 82 sums the signals derived from sensors associated with one of the axles at a time 72*a–b,* and generates a single axle load output signal, indicated by 84. Signal 84 is proportional to a sum of the actual loads imposed on that axle of the vehicle.

According to the second embodiment of the invention, the control unit further includes a comparator 86. Comparator 86 compares single axle load output signal 84 with a threshold maximal axle load value, indicated by 88.

According to a preferred embodiment, whenever single axle load output signal 84 exceeds threshold maximal axle load value 88, the indication unit generates an indication, indicated by 90, indicating that the output signal exceeds the threshold value. As described above and for similar reasons, the indication may be any sensible indication and the control unit is preferably programmable.

In a preferred embodiment the load over each of the axles of the vehicle is monitored and compared to its specific threshold as described. It should be known to that in many cases the regulations permit different maximal loads for different axles of the same vehicle.

Figure 6:
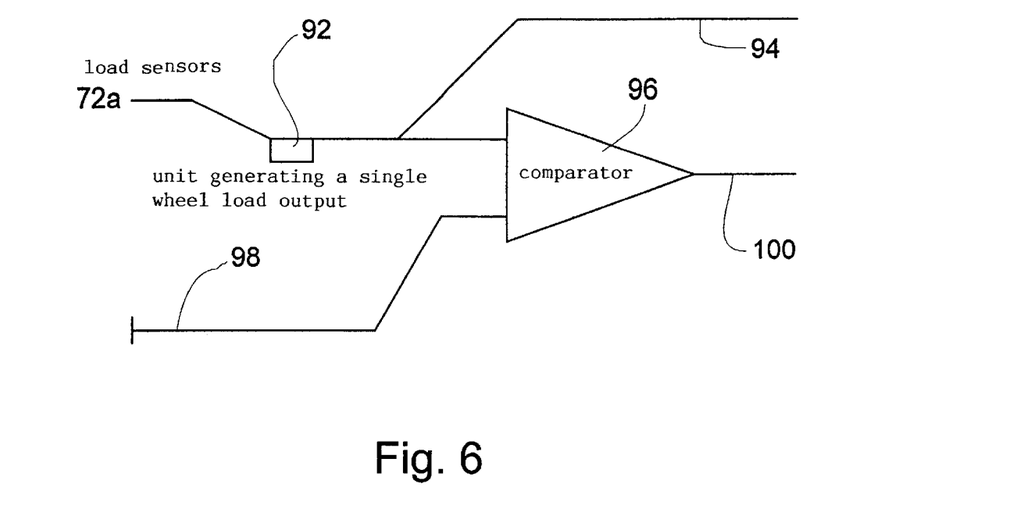
FIG. 6 depicts a basic algorithm which determines the load on a single wheel/bearing unit of the vehicle and compares that load to a threshold value according to the present invention.

With reference now to FIG. 6, presented is a third embodiment of the system according to the present invention. According to the third embodiment, the system is directed at determining the load imposed on a single load bearing unit, or wheel, of the vehicle and comparing that load to a threshold value.

To this end, the control unit includes a unit, indicated by 92, which generates a single wheel load output signal, indicated by 94, which is proportional to the actual load imposed on that wheel or bearing unit of the vehicle. The system further includes a comparator, indicated by 96, for comparing single wheel load output signal 94 with a threshold maximal wheel load value, indicated by 98.

According to a preferred embodiment, whenever output signal 94 exceeds threshold value 98, the indication unit generates an indication, indicated by 100, indicating that the output signal exceeds the threshold value.

As described above and for similar reasons, the indication may be any sensible indication and the control unit is preferably programmable.

Preferably, the load over each of the wheels or bearing unit of the vehicle is monitored and compared to the threshold as described. It should be known that in many cases the regulations permit different maximal loads for different wheels of the same vehicle.

Figure 7:
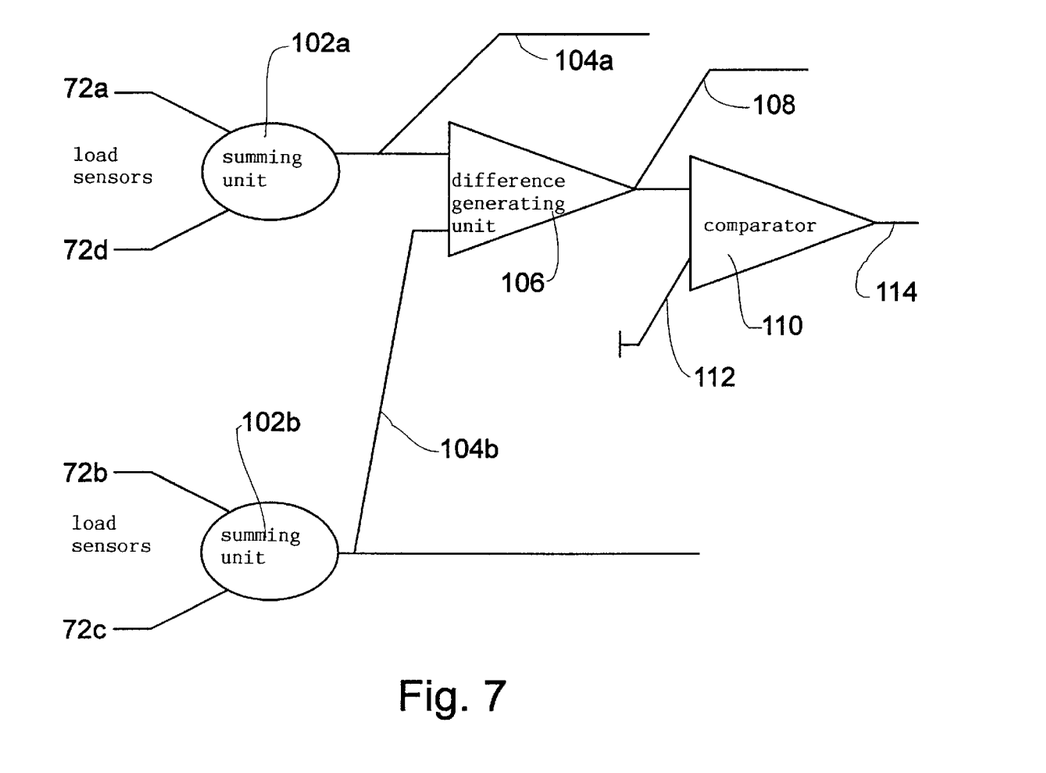
FIG. 7 depicts a basic algorithm which summarize the total load imposed on each of the sides of the vehicle, calculates the difference between the sides and compares the difference to a threshold value according to the present invention.

With reference now to FIG. 7, presented is a fourth embodiment of the system according to the present invention. According to the fourth embodiment, the system is directed at determining the load imposed on each side of the vehicle, calculates the difference and compare the difference to a threshold value.

To this end the control unit includes a first summing unit 102*a.* Summing unit 102*a* sums signals derived from sensors associated with one of the sides of the vehicle, indicated by 72*a* and 72*d,* and generates a first single side load output signal, indicated by 104a, which is proportional to a sum of the actual loads imposed on that side of the vehicle.

The control unit further includes a second summing unit, indicated by 102b. Unit 102b sums signals 72b–c derived from sensors associated with the other side of the vehicle and generates a second single side load output signal 104b, which is proportional to a sum of the actual loads imposed on the other side of the vehicle.

The control unit further includes a difference generating unit 106 (e.g., a differential amplifier) for generating a vehicle side difference load output signal, indicated by 108, which is proportional to a difference of the actual loads imposed on the sides of the vehicle.

The control unit further includes a comparator, indicated by 110, for comparing side difference load output signal 108 with a threshold maximal vehicle side difference load value 112.

According to a preferred embodiment, whenever output signal 108 exceeds threshold value 112, the indication unit generates an indication, indicated by 114, indicating that the output signal exceeds the threshold value. As described above and for similar reasons, the indication may be any sensible indication and the control unit is preferably programmable.

Figure 8:
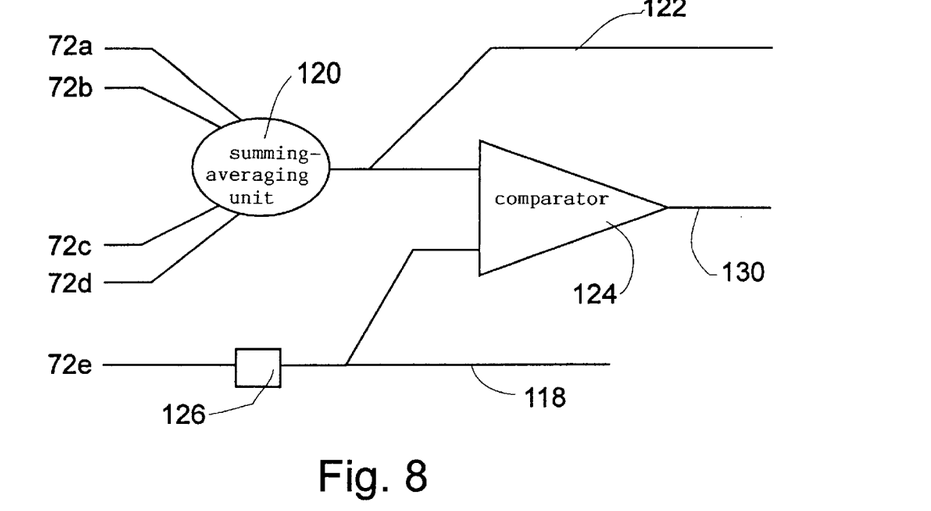
FIG. 8 depicts a basic algorithm which compares the load on a single wheel to the average load on its side, and activates an indication according to the result, all in accordance with the present invention.

With reference now to FIG. 8, presented is a fifth embodiment of the system according to the present invention. According to the fifth embodiment, the system is directed at comparing the load on a single wheel or bearing unit to the average load per wheel or bearing unit.

To this end, the control unit includes a summing-averaging unit, indicated by 120. Unit 120 sums and averages signals derived from sensors 72a–d associated with at least some of the wheels or bearing units of the vehicle (e.g., all, or those associated with a specific side of the vehicle), and generates an average wheel load output signal, indicated by 122. Signal 122 is proportional to an average load imposed on each of the wheels of the wheels selected for averaging.

The control unit further includes at least one, preferably, a plurality of comparators, indicated by 124, for comparing the average wheel load output signal 122 with the actual loads for each of the wheels.

In the Example of FIG. 8, comparator 120 associates with the bearing unit or wheel associated with sensor 72c. Comparator 120, therefore, receives a signal 128 via unit 126, wherein signal 128 is proportional to the actual load imposed on that wheel.

According to a preferred embodiment, whenever one of the actual loads on a specific wheel differs from the average wheel load output signal the indication unit generates an indication 130.

According to this embodiment the system detects a lack of air or deflation situation in the wheels, wherein the measured load imposed on the wheel or its associated bearing unit is reduced, and/or a broken or damaged bearing units, wherein the measured load imposed on the wheel or its associated bearing unit is increased.

Figure 9:
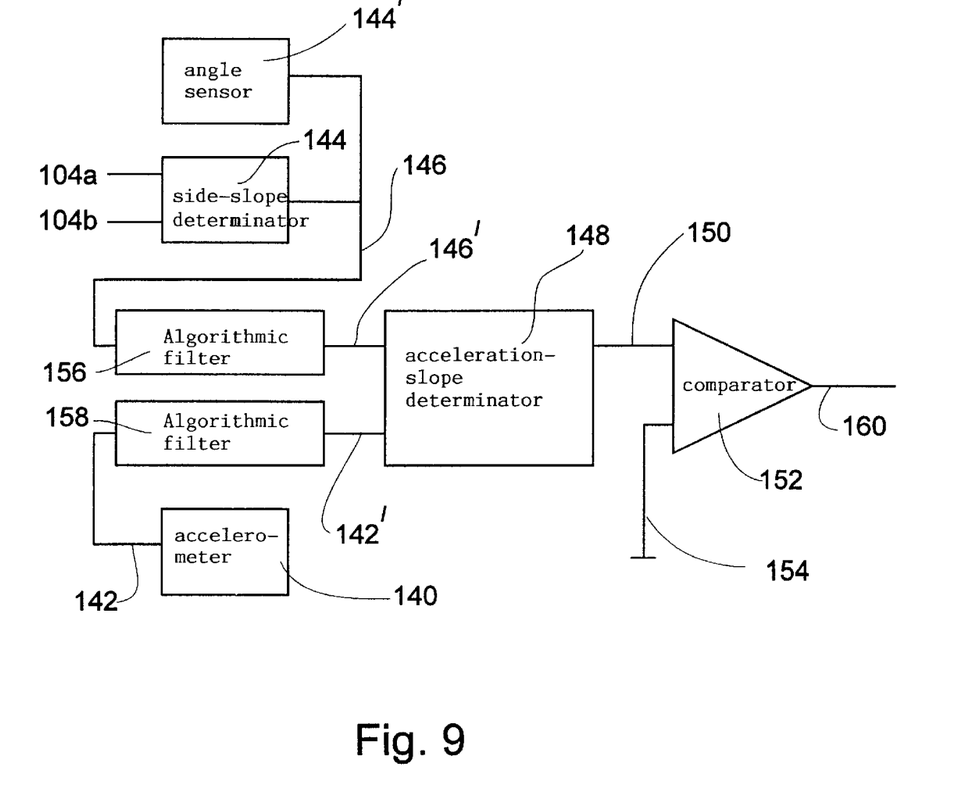
FIG. 9 depicts an algorithm directed at warning a driver when the vehicle faces a dangerous instability situation according to the present invention.

With reference now to FIG. 9, presented is a sixth embodiment of the system according to the present invention. According to the sixth embodiment, the system is directed at warning a driver when the vehicle faces a dangerous instability situation, for example, upon a sharp turn taken at a high speed.

A marginal instability situation is defined herein as a situation wherein one side of the vehicle is about to loose contact with the road due to inertial momentum.

The behavior of a vehicle taking a curve can be described by the following equation:

$$a/g = tg\ \alpha$$

where a is the angular acceleration of the vehicle; g is the acceleration imposed by gravity and $\alpha$ is the lean (side-slope) of the vehicle in the given side acceleration.

However, for critical $\alpha$ values, i.e., when at least a marginal instability situation, as defined above, has occurred:

$$tg\ \alpha = h/d$$

where d is the width of the wheel base and h is the designed center of gravity of the vehicle.

The $\alpha$ values of marginal instability are too dangerous and preferably an angle $\beta(\beta=\alpha/x; x>1)$, which is smaller than $\alpha$, is taken as a threshold.

Figure 10:
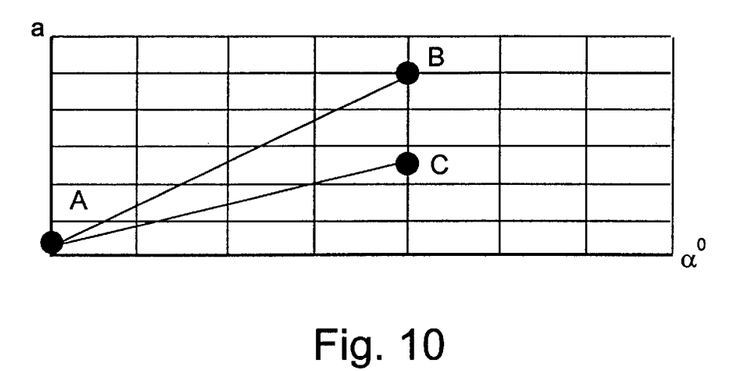
FIG. 10 is a graphic presentation of combinations of permitted and non-permitted (dangerous) side slope-acceleration values.

Referring now to line A-B in the graph of FIG. 10, during a dynamic behavior, the higher the side acceleration (a) is, a higher lean ($\alpha$) is imposed on the vehicle. Point B therefore indicates a point of no return. Line A-B thus represents the marginal instability condition, and therefore any side slope/acceleration condition which falls above line A-B indicates dangerous instability. However, as long as the lean angle $\alpha$ is below line A-C the stability condition is safe. A warning signal is therefore preferably given when the side slope/acceleration is above line A-C. Line A-C therefore represents the upper limit of safe combinations of side acceleration/lean angle.

Thus according to the present embodiment, in addition to the sensors and control unit the system includes a side (e.g., angular) accelerometer, indicated by 140. Meter 140 is appropriately mounted on the vehicle and serves for generating a side acceleration input signal 142 which is proportional to an actual side acceleration imposed on the vehicle, thereby serves for measuring the side acceleration of the vehicle.

Suitable accelerometers are the silicon accelerometers distributed, for example, by Lucas NovaSensor, 1055 Mission Court, Fremont, Calif. 94539; and the accelerometers distributed by TEXAS INSTRUMENTS. It being understood that rendering an accelerometer a side accelerometer merely depends on its mounting orientation.

The control unit is in data communication with each of the load sensors and with side accelerometer 140, such that the control unit collects both the load and the acceleration input signals.

The control unit includes a first summing unit for summing signals derived from load sensors associated with one of the sides of the vehicle, and for generating a first single side load output signal which is proportional to a sum of the actual loads imposed on that side of the vehicle. The control unit further includes a second summing unit for summing signals derived from sensors associated with the other side of the vehicle, and for generating a second single side load output signal which is proportional to a sum of the actual loads imposed on the other side of the vehicle. The first and second summing units and their associated signals are further described with respect to FIG. 7 above.

The control unit further includes a side-slope determinator 144 for generating a side-slope output signal 146, which proportional to an actual side-slope to which the vehicle is imposed, by comparing the first and second single side load output signals 104a and 104b.

The control unit further includes an acceleration-slope determinator 148 (e.g., look-up table) for generating an acceleration-slope output signal 150. Determinator 148 may function as described with respect to FIG. 10 above. The control unit further includes a comparator 152 for comparing the acceleration-slope output signal 150 with a threshold maximal acceleration-slope value 154.

In a preferred embodiment the control unit further includes algorithmic filters 156 and 158 for eliminating road noise and fast transients associated with the input signals of the load sensors and the accelerometer. The filters outputs form a filtered acceleration output signal 142' and a filtered side-slope output signal 146'. The signals are preferably normalized while entering to determinator 148.

Alternatively, the control unit is in data communication with an angle (lean) sensor 144' which generates a lean (side slope) input signal 146 and with side accelerometer 140, such that the control unit collects both the lean and the acceleration input signals. A suitable angle sensor is distributed by Philips (Postbus 90050, 5600 PB EINDHOVEN, Bldg. VB).

The system according to this embodiment of the invention serves to indicate that either the slope is not proportional to the present acceleration, which may lead to a hazardous situation in that type of vehicle, or, that the vehicle is too close to lose its balance due to a high center of gravity.

According to a preferred embodiment, whenever the acceleration-slope output signal exceeds the threshold maximal acceleration-slope value the indication unit generates an indication 160 indicating to this effect.

All or some of the systems according to the various embodiments hereinabove described are preferably integrated into an integrated on-board envelope safety system. In this case a single control unit preferably perform all the functions described above, such that the driver is made aware of any deviation from the various thresholds.

Additional sensors may be employed and the data derived from them used to thicken the safety monitoring provided by the system of the present invention. For example, a second accelerometer may be employed to measure the forward acceleration or deceleration of the vehicle, a timer may be employed, for example, in combination with the inherent speedometer of the vehicle to do the same. A timer may also be employed independently. The speedometer may also serve as a monitor to determine whether the vehicle is still or moving. This information can be used to shut off systems, such as the total load determining system described with respect to FIG. 4 above. A dating device may also be employed. Collectively, the data derived from these meters and devices, as well as the data derived from the various systems described hereinabove, may be recorded and may therefore be used to provide the vehicle with a "black box".

For example, a lack of air, deflation and or a broken/damaged load bearing unit situations are all characterized by altered (increased/decreased) friction of the associated wheel with the road, and as a result the wheel undergoes a temperature change. Such temperature changes may be monitored by any suitable temperature sensor (e.g., thermometer) and the data derived therefrom used to indicate the above situations.

Figure 11:
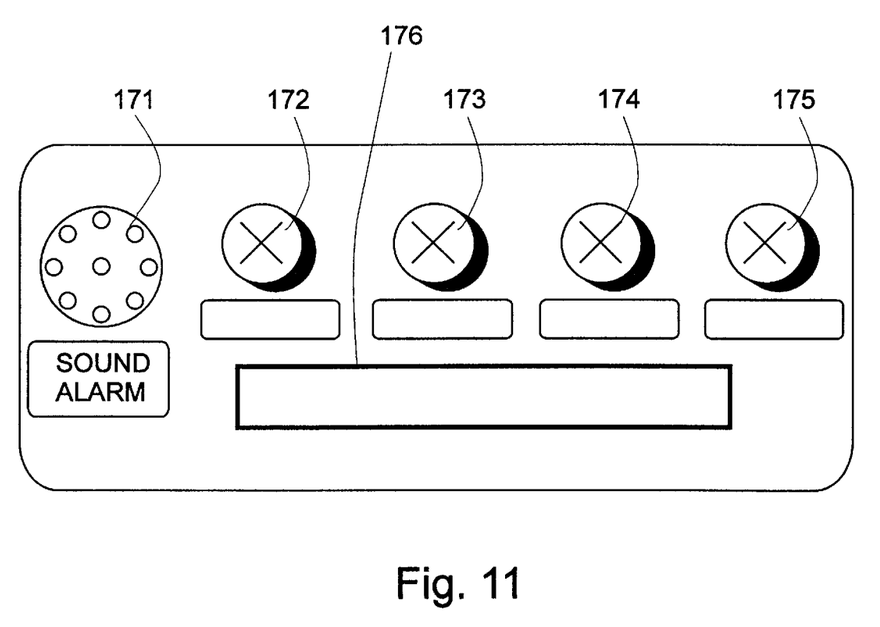
FIG. 11 presents a front panel providing hazard signals and information derived from the system according to the present invention.

Preferably, as shown in FIG. 11, the indicator units according to any of the embodiments are integrated into an indication panel which includes visible indicators 172–175, a display indicator 176 and a audible indicator 171. The visible indicators may be used to indicate an overload situation (total, axle and/or wheel specific overloads), a suspension/deflation situation, a load imbalance situation and/or a slope instability situation. Various parameters, such as the total load, its percentage from the maximal threshold load and other messages ol informative value may be displayed on display 176. In the case of a dangerous situation an audible alarm may be activated via audible indicator 171. The indication panel may also be devised as a head up display (HUD). HUD technology is well known and requires no further description.

According to the present invention provided is a method for safety control in a vehicle. The method includes any single step of the following or any combination thereof. First, indicating that a total load imposed on the vehicle exceeding a maximal total load value. Second, indicating that a single axle load exceeding a threshold maximal axle load value. Third, indicating that a single wheel load exceeding a threshold maximal single wheel load value. Fourth, indicating that a side difference load exceeding a threshold maximal vehicle side difference load value. Fifth, indicating that an actual load being imposed on a wheel being different from a measured and calculated average wheel load. And finally, indicating that an acceleration-slope value exceeding a threshold maximal acceleration-slope value. Any of these steps is preferably effected via the various embodiments of the on-board safety system hereinabove described.

While the invention has been described with respect to a limited number of embodiments, it will be appreciated that many variations, modifications and other applications of the invention may be made.

What is claimed is:

1. An on-board system for safety control in a vehicle, the vehicle including a plurality of axles and a plurality of load bearing units and wheels arranged on both sides of each of the axles and therefore on both sides of the vehicle, the system comprising:

(a) load sensors, each of said load sensors being associated with one of the plurality of load bearing units, each of said load sensors being for generating an input signal proportional to an actual load being imposed on its respective load bearing unit, thereby serving for measuring said actual load; and (b) a control unit, said control unit being in data communication with each of said sensors, such that said control unit collects said input signals, said control unit including:

(i) a first summing unit for summing said input signals and for generating a total load output signal being proportional to a sum of said actual loads imposed on all of said load bearing units;

(ii) a first comparator for comparing said total load output signal with a threshold total load value;

(iii) a summing-averaging unit for summing and averaging signals derived from sensors associated with at least some of the wheels of the vehicle, and for generating an average wheel load output signal being proportional to an average load imposed on each of the wheels of said at least some wheels; and (iv) a plurality of comparators for comparing said average wheel load output signal with said actual loads for each of the wheels of said at least some wheels, such that wheel deflation and bearing unit failure are detectable.

2. The system of claim 1, further comprising:

(c) an indication unit communicating with said control unit; wherein whenever said total load output signal exceeds said threshold total load value said indication unit generates an indication indicating that said total load output signal exceeds said threshold total load value.

3. The system of claim 1, wherein said control unit is programmable, such that said threshold total load value is programmable.

4. The system of claim 1, wherein said control unit further includes:
- (v) a second summing unit for summing signals derived from sensors associated with one of said axles at a time, and for generating a single axle load output signal being proportional to a sum of actual loads imposed on one of said axles; and
- (vi) a second comparator for comparing said single axle load output signal with a threshold maximal axle load value of that single axle.

5. The system of claim 4, further comprising:
- (c) a first indication unit communicating with said control unit;
  wherein whenever said total load output signal exceeds said threshold total load value said indication unit generates an indication indicating that said total load output signal exceeds said threshold total load value; and
- (d) an second indication unit communicating with said control unit;
  wherein whenever said single axle load output signal exceeds said threshold maximal axle load value said indication unit generates an indication indicating that said single axle load output signal exceeds said threshold maximal axle load value.

6. The system of claim 5, wherein said control unit is programmable, such that said threshold total load value and said maximal axle load value are programmable.

7. The system of claim 1, wherein said control unit further includes:
- (v) a unit for generating a single wheel load output signal being proportional to said actual load imposed on one of said wheels; and
- (vi) a second comparator for comparing said single wheel load output signal with a threshold maximal wheel load value.

8. The system of claim 4, wherein said control unit further includes:
- (vii) a unit for generating a single wheel load output signal being proportional to said actual loads imposed on one of said wheels; and
- (viii) a third comparator for comparing said single wheel load output signal with a threshold maximal wheel load value.

9. The system of claim 1, wherein said control unit further includes:
- (v) a second summing unit for summing signals derived from sensors associated with one of the sides of the vehicle, and for generating a first single side load output signal being proportional to a sum of said actual loads imposed on that side of the vehicle;
- (vi) a third summing unit for summing signals derived from sensors associated with the other side of the vehicle, and for generating a second single side load output signal being proportional to a sum of said actual loads imposed on said other side of the vehicle;
- (vii) a difference generating unit for generating a vehicle side difference load output signal being proportional to a difference of said actual loads imposed on said sides of the vehicle; and
- (viii) a second comparator for comparing said vehicle side difference load output signal with a threshold maximal vehicle side difference load value.

10. The system of claim 8, wherein said control unit further includes:
- (ix) a third summing unit for summing signals derived from sensors associated with one of the sides of the vehicle, and for generating a first single side load output signal being proportional to a sum of said actual loads imposed on that side of the vehicle;
- (x) a fourth summing unit for summing signals derived from sensors associated with the other side of the vehicle, and for generating a second single side load output signal being proportional to a sum of said actual loads imposed on said other side of the vehicle;
- (xi) a difference generating unit for generating a vehicle side difference load output signal being proportional to a difference of said actual loads imposed on said sides of the vehicle; and
- (xii) a fourth comparator for comparing said vehicle side difference load output signal with a threshold maximal vehicle side difference load value.

11. An on-board system for safety control in a vehicle, the vehicle including a plurality of axles and a plurality of load bearing units and wheels arranged on both sides of each of the axles, the system comprising:
- (a) load sensors, each of said load sensors being associated with one of the plurality of load bearing units, each of said load sensors being for generating an input signal proportional to an actual load being imposed on its respective load bearing unit, thereby serving for measuring said actual load; and
- (b) a control unit, said control unit being in data communication with each of said sensors, such that said control unit collects said input signals, said control unit including:
  - (i) a summing unit for summing signals derived from sensors associated with one of said axles at a time, and for generating a single axle load output signal being proportional to a sum of said actual loads imposed on one of said axles;
  - (ii) a comparator for comparing said single axle load output signal with a threshold maximal axle load value;
  - (iii) a summing-averaging unit for summing and averaging signals derived from sensors associated with at least some of the wheels of the vehicle, and for generating an average wheel load output signal being proportional to an average load imposed on each of the wheels of said at least some wheels; and
  - (iv) a plurality of comparators for comparing said average wheel load output signal with said actual loads for each of the wheels of said at least some wheels, such that wheel deflation and bearing unit failure are detectable.

12. The system of claim 11, further comprising:
- (c) an indication unit communicating with said control unit; wherein whenever said single axle load output signal exceeds said threshold maximal axle load value said indication unit generates an indication indicating that said single axle load output signal exceeds said threshold maximal axle load value.

13. An on-board system for safety control in a vehicle, the vehicle including a plurality of axles and a plurality of load bearing units and wheels arranged on both sides of each of the axles, the system comprising:
- (a) load sensors, each of said load sensors being associated with one of the plurality of load bearing units, each of said load sensors being for generating an input signal proportional to an actual load being imposed on its respective load bearing unit, thereby serving for measuring said actual load; and (b) a control unit, said control unit being in data communication with each of said sensors, such that said control unit collects said input signals, said control unit including
  (i) a unit for generating a single wheel load output signal being proportional to said actual loads imposed on one of said wheels;
  (ii) a comparator for comparing said single wheel load output signal with a threshold maximal wheel load value;
  (iii) a summing-averaging unit for summing and averaging signals derived from sensors associated with at least some of the wheels of the vehicle, and for generating an average wheel load output signal being proportional to an average load imposed on each of the wheels of said at least some wheels; and
  (iv) a plurality of comparators for comparing said average wheel load output signal with said actual loads for each of the wheels of said at least some wheels, such that wheel deflation and bearing unit failure are detectable.

14. The system of claim 13, further comprising:
(c) an indication unit communicating with said control unit; wherein whenever said single wheel load output signal exceeds said threshold maximal wheel load value said indication unit generates an indication indicating that said single wheel load output signal exceeds said threshold maximal wheel load value.

15. An on-board system for safety control in a vehicle, the vehicle including a plurality of axles and a plurality of load bearing units and wheels arranged on both sides of each of the axles and therefore on both sides of the vehicle, the system comprising:
(a) load sensors, each of said load sensors being associated with one of the plurality of load bearing units, each of said load sensors being for generating an input signal proportional to an actual load being imposed on its respective load bearing unit, thereby serving for measuring said actual load; and
(b) a control unit, said control unit being in data communication with each of said sensors, such that said control unit collects said input signals, said control unit including:
  (i) a first summing unit for summing signals derived from sensors associated with one of the sides of the vehicle, and for generating a first single side load output signal being proportional to a sum of said actual loads imposed on that side of the vehicle;
  (ii) a second summing unit for summing signals derived from sensors associated with the other side of the vehicle, and for generating a second single side load output signal being proportional to a sum of said actual loads imposed on said other side of the vehicle;
  (iii) a difference generating unit for generating a vehicle side difference load output signal being proportional to a difference of said actual loads imposed on said sides of the vehicle;
  (iv) a comparator for comparing said vehicle side difference load output signal with a threshold maximal vehicle side difference load value;
  (v) a summing-averaging unit for summing and averaging signals derived from sensors associated with at least some of the wheels of the vehicle, and for generating an average wheel load output signal being proportional to an average load imposed on each of the wheels of said at least some wheels; and
  (vi) a plurality of comparators for comparing said average wheel load output signal with said actual loads for each of the wheels of said at least some wheels, such that wheel deflation and bearing unit failure are detectable.

16. The system of claim 15, further comprising:
(c) an indication unit communicating with said control unit; wherein whenever said vehicle side difference load output signal exceeds said threshold maximal vehicle side difference value said indication unit generates an indication indicating that said vehicle side difference load output signal exceeds said threshold maximal vehicle side difference value.

17. An on-board system for safety control in a vehicle, the vehicle including a plurality of axles and a plurality of load bearing units and wheels arranged on both sides of each of the axles and therefore on both sides of the vehicle, the system comprising:
(a) load sensors, each of said load sensors being associated with one of the plurality of load bearing units, each of said load sensors being for generating an input signal proportional to an actual load being imposed on its respective load bearing unit, thereby serving for measuring said actual load; and
(b) a control unit, said control unit being in data communication with each of said sensors, such that said control unit collects said input signals, said control unit including:
  (i) a summing-averaging unit for summing and averaging signals derived from sensors associated with at least some of the wheels of the vehicle, and for generating an average wheel load output signal being proportional to an average load imposed on each of the wheels of said at least some wheels; and
  (ii) a plurality of comparators for comparing said average wheel load output signal with said actual loads for each of the wheels of said at least some wheels, such that wheel deflation and bearing unit failure are detectable.

18. The system of claim 17, further comprising:
(c) an indication unit communicating with said control unit; wherein whenever one of said actual loads differs from said average wheel load output signal said indication unit generates an indication.

19. An on-board system for safety control in a vehicle, the vehicle including a plurality of axles and a plurality of load bearing units and wheels arranged on both sides of each of the axles and therefore on both sides of the vehicle, the system comprising:
(a) load sensors, each of said load sensors being associated with one of the plurality of load bearing units, each of said load sensors being for generating a load input signal proportional to an actual load being imposed on its respective load bearing unit, thereby serving for measuring said actual load;
(b) a side accelerometer being mounted on the vehicle, said side accelerometer being for generating an acceleration input signal proportional to an actual side acceleration being imposed on said vehicle, thereby serving for measuring said side acceleration of the vehicle; and
(c) a control unit, said control unit being in data communication with each of said sensors and with said side accelerator, such that said control unit collects said load and acceleration input signals, said control unit including:

(i) a first summing unit for summing signals derived from sensors associated with one of the sides of the vehicle, and for generating a first single side load output signal being proportional to a sum of said actual loads imposed on that side of the vehicle;

(ii) a second summing unit for summing signals derived from sensors associated with the other side of the vehicle, and for generating a second single side load output signal being proportional to a sum of said actual loads imposed on said other side of the vehicle;

(iii) a side-slope determinator for generating a side-slope output signal being proportional to an actual side-slope to which the vehicle being imposed by comparing said first and second single side load output signals;

(iv) an acceleration-slope determinator for generating an acceleration-slope output signal; and (v) a comparator for comparing said acceleration-slope output signal with a threshold maximal acceleration-slope value.

20. The system of claim 19, further comprising:

(c) an indication unit communicating with said control unit; wherein whenever said acceleration-slope output signal exceeds said threshold maximal acceleration-slope value said indication unit generates an indication indicating that said acceleration-slope output signal exceeds said threshold maximal acceleration-slope value.

21. An on-board system for safety control in a vehicle comprising:

(a) an angle sensor mounted on the vehicle for generating a side-slope output signal being proportional to an actual side-slope to which the vehicle being imposed, thereby serving for measuring said actual side slope;

(b) a side accelerometer being mounted on the vehicle, said side accelerometer being for generating an acceleration input signal proportional to an actual side acceleration being imposed on said vehicle, thereby serving for measuring said side acceleration of the vehicle; and (c) a control unit, said control unit being in data communication with said angle sensor and with said side accelerator, such that said control unit collects said side-slope and said acceleration input signals, said control unit including:

(i) an acceleration-slope determinator for generating an acceleration-slope output signal; and (ii) a comparator for comparing said acceleration-slope output signal with a threshold maximal acceleration-slope value.

22. The system of claim 21, further comprising:

(c) an indication unit communicating with said control unit; wherein whenever said acceleration-slope output signal exceeds said threshold maximal acceleration-slope value said indication unit generates an indication indicating that said acceleration-slope output signal exceeds said threshold maximal acceleration-slope value.

23. A method for safety control in a vehicle comprising the steps of:

(a) indicating that an actual load being imposed on a wheel being different from a measured and calculated average wheel load, such that wheel deflation and bearing unit failure are detectable; and (b) indicating that a total load imposed on the vehicle exceeding a maximal total load value.

24. The method of claim 23, further comprising the step of:

(c) indicating that a single wheel load exceeding a threshold maximal single wheel load value.

25. The method of claim 23, further comprising the step of:

(c) indicating that a side difference load exceeding a threshold maximal vehicle side difference load value.

26. The method of claim 23, further comprising the step of:

(c) indicating that a single axle load exceeding a threshold maximal axle load value.

27. The method of claim 23, further comprising the step of:

(c) indicating that an acceleration-slope value exceeding a threshold maximal acceleration-slope value.

28. The method of claim 25, further comprising the step of:

(d) indicating that a side difference load exceeding a threshold maximal vehicle side difference load value.

29. A method for safety control in a vehicle comprising the step of:

(a) indicating that an acceleration-slope value exceeding a threshold maximal acceleration-slope value; and (b) indicating that a total load imposed on the vehicle exceeding maximal total load value.

30. The method of claim 29, further comprising the step of:

(c) indicating that a single wheel load exceeding a threshold maximal single wheel load value.

31. The method of claim 29, further comprising the step of:

(c) indicating that an actual load being imposed on a wheel being different from a measured and calculated average wheel load.

32. The method of claim 29, further comprising the step of:

(c) indicating that a side difference load exceeding a threshold maximal vehicle side difference load value.

33. The method of claim 25, further comprising the step of:

(d) indicating that an acceleration-slope value exceeding a threshold maximal acceleration-slope value.

* * * * *